March 7, 1967 J. T. CIPKOWSKI 3,307,863
QUICK FASTENING CONNECTION
Filed Sept. 9, 1964 2 Sheets-Sheet 1
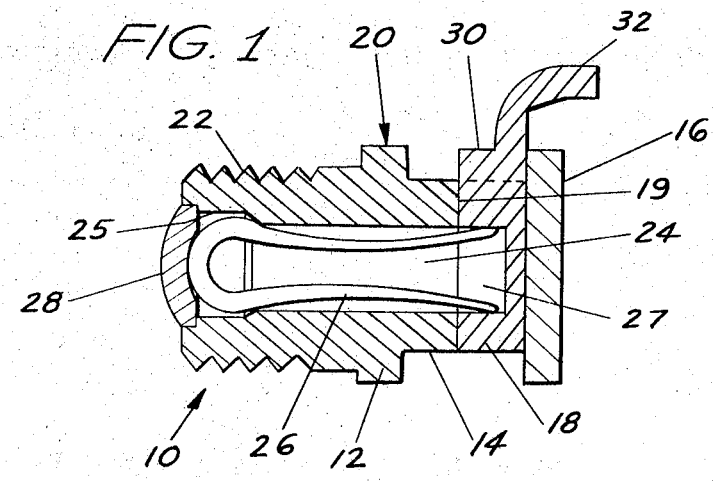
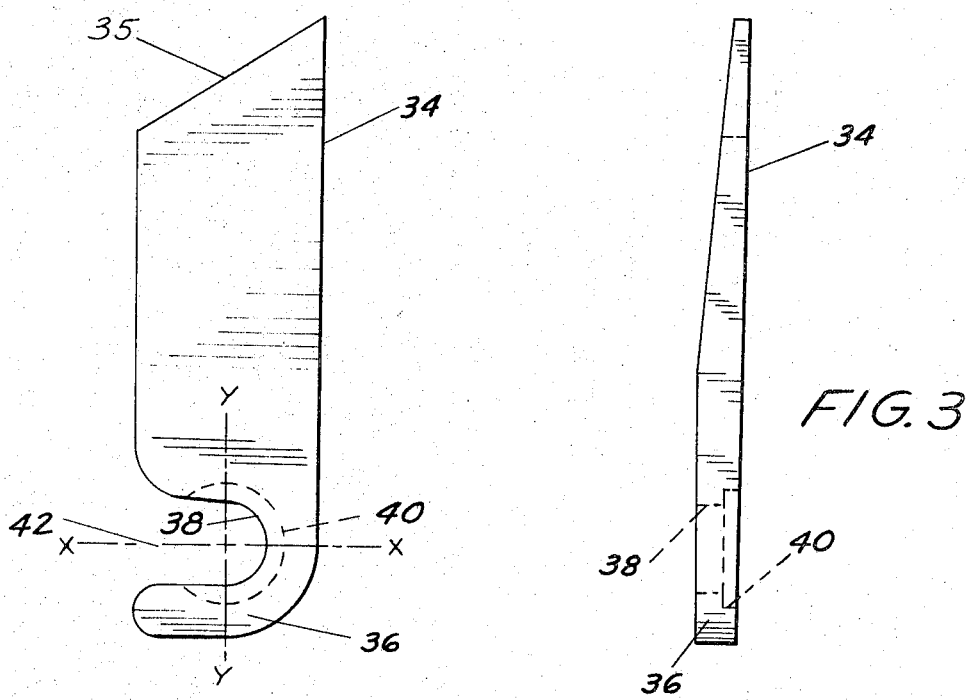
INVENTOR
JEROME T. CIPKOWSKI
BY H. M. Saragovitz
E. J. Kelly
H. Berl and
E. P. Barthel
ATTORNEYS March 7, 1967 J. T. CIPKOWSKI 3,307,863
QUICK FASTENING CONNECTION
Filed Sept. 9, 1964 2 Sheets-Sheet 2

INVENTOR
JEROME T. CIPKOWSKI
BY H. M. Saragovitz
E. J. Kelly
H. Berl and
E. P. Barthel
ATTORNEYS

United States Patent Office 3,307,863
Patented Mar. 7, 1967

3,307,863
QUICK FASTENING CONNECTION
Jerome T. Cipkowski, Dearborn, Mich., assignor to the United States of America as represented by the Secretary of the Army
Filed Sept. 9, 1964, Ser. No. 395,341
5 Claims. (Cl. 287—189.36)

The invention described herein may be manufactured and used by or for the Government of the United States of America for governmental purposes without the payment of any royalties thereon or therefor.

The present invention relates to a quick fastening connection for a strut member and more particularly to a quick fastening connection capable of connecting and disconnecting the end of a strut member to a cooperating locking shaft without the use of tools or detachable brackets.

Hook-shaped or gooseneck connections adapted to quickly attach and detach strut members of the type disclosed in V. W. Meng Patent No. 2,640,734 issued June 2, 1953, for sectional scaffolding, for example, have been known in the prior art in many forms. Generally, these prior art fastening devices have employed a hook-shaped end to partially embrace and rest upon a tubular member together with a latch pin reciprocally mounted to close the throat of the hook and engage the tubular member.

The present invention starts with the basic concept of the hook-shaped connection and applies the principle to a specially designed hook and cooperating locking shaft incorporating a displaceable holding pin that allows the hook to be shifted laterally a slight amount to engage a locking shoulder on the shaft. Stresses along the principal axis of the strut are taken up by the interlocking circular segmental portions of the hook and shaft thus eliminating the need for operating members on the strut.

Therefore, it is a primary object of the present invention to provide a quickly-operable, reliable fastening device for securing removable strut members to a supporting structure.

It is another object of the present invention to provide a fastener device which is dependent for its load transmitting characteristics upon bearing area engagement between the mating members and which does not depend upon movable locking means for resisting the uncoupling forces.

Yet another object of the invention is to provide a fastening device which can secure a strut or similar member to cooperating shaft member and which does not have any movable parts on the strut member thus reducing the likelihood of damage to the locking mechanism and lowering the cost of replacing damaged portions of the device.

These and other objects and advantages of the invention will become apparent to those skilled in the art after reading the present specification and the acompanying drawings forming a part thereof, in which:

FIG. 1 is an enlarged section view of the lock assembly portion of the fastening device showing the installation of the pin and loop spring members.

FIG. 2 is a side elevation of the cooperating arm portion of the fastening device which can be joined to a strut member or the like.

FIG. 3 is an end elevation of the arm of FIG. 2.

Figure 4:
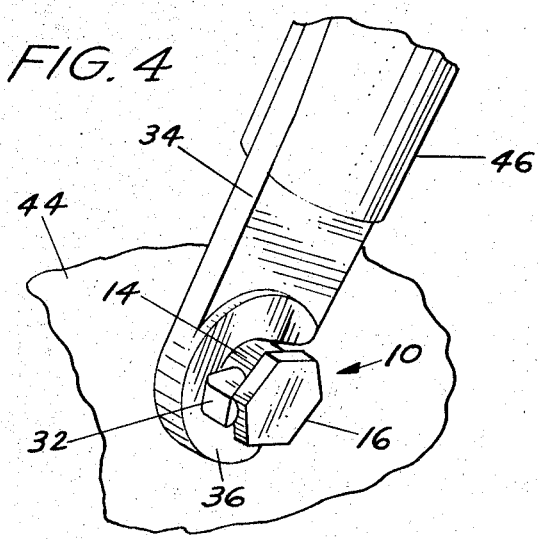
FIG. 4 is a perspective view of the fastening device secured to a vertical structural panel member made in accordance with the teaching of this invention.

Referring now to the drawings, wherein like reference characters designate like or corresponding parts throughout the several views, there is shown in FIG. 1 a lock assembly 10 in the form of a bolt having a shaft 12 including a smooth cylindrical barrel portion 14 and a head 16. Retaining pin or plunger 18 is received in bore 19 for sliding movement transverse to the axis of the shaft 12. An engaging shoulder 20 is integrally formed on the shaft 12 and is located intermediate the head 16 and the threaded end portion 22.

Axially extending cavity 24 is provided in the shaft 12 with the counterbored portion 25 extending from the threaded end to allow for the insertion of the hairpin or open loop type spring 26. The cavity can then be packed with protective grease, if desired, and sealed by cap 28 using suitable means such as peening or press fitting. As can be seen in FIG. 1, the head of the spring 26 fits within the counterbore 25, and the bifurcated end extends into the recess 27 formed in pin 18. It will be noted that the recess 27 is located in the pin 18 so that when spring 26 is in its neutral position a portion of the circular body of the pin approximately equal to the difference in diameters between the shoulder 20 and the barrel 14 extends above the surface of the shaft. The exposed portion of the pin has a section cut-away forming a notch 30 while the remaining part is formed into an actuator 32 extending coaxial with the principal axis of the shaft in a direction away from the notch.

Figure 5:
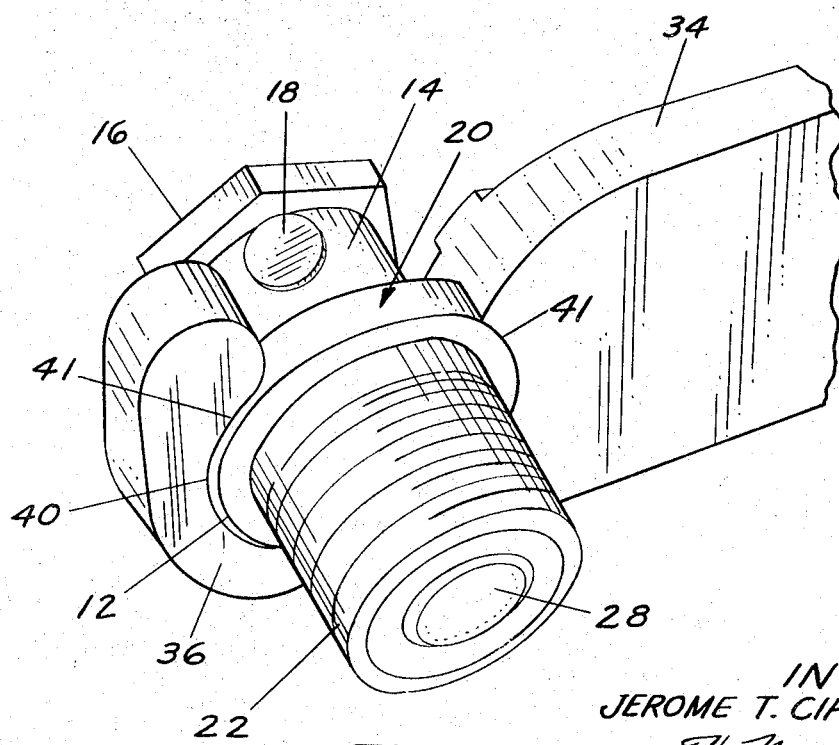
FIG. 5 is a perspective view of the fastening device showing the normally hidden side of the arm and lock assembly.

FIGS. 4 and 5 show the assembled fastener device which comprises the lock assembly 10 together with engaging arm 34 in its fully locked position allowing for rotatable adjustment of the arm about the principal axis of shaft 12. It will of course be understood by those skilled in the art that, while locking member 10 is herein described as being a separate threadably insertable member, such a lock could be formed integrally with a tubular structural member, and that for many purposes such an arrangement would possess advantages over the present embodiment.

In the heavy duty structure of the instant fastening device, arm 34 may be manufactured of any appropriate plate material, but preferably it is of a high-strength alloy steel with a mitered portion 35 adapted to be inserted into an aperture in a supporting strut 46 by means of welding or other suitable methods. While the hooked end of arm 34 may be formed by any suitable shop technique, the instant embodiment employs a quick inexpensive method whereby bore 38 is counterbored to form locking seat recess 40 after which a portion of the plate is removed to form a pass or throat 42 for the entrance of the barrel 14. The diameter of the bore 38 is slightly larger than the diameter of barrel 14 to enable the remaining semicircular portion of the bore to seat on the barrel. It will be noted in FIG. 2 that the throat 42 is centered on, and its sides are parallel to, the horizontal axis X—X for the portion of the throat between the vertical axis Y—Y and the intersection of the throat with the dashed line of counterbore 40. Expressed differently, the length of the throat portion 42 formed by parallel tangents to bore 38 is shown as substantially equal to the difference in diameters of bore 38 and counterbore 40.

Engagement or fastening of the device of this invention consists in first inserting the locking bolt member 10 into a threaded opening in a structural panel, as shown for example by the panel member 44 in FIG. 4, by positioning the threaded end 20 therein and simply drawing up the lock assembly by means of a suitable bolt fastening tool. Final adjustment and tensioning of lock bolt 10 is effected by means of shoulder 20 which is positioned adjacent threaded portion 22 to contact the vertical surface of member 44. After such initial adjustment, the quick disengagement and engagement features of the present invention allow the strut member 46 to be released and displaced and then returned to its original close proxnal relationship with panel 44 without the necessity of any further take up or adjustment of the locking bolt.

FIG. 2 shows the width of throat 42 to be at least equal to the diameter of bore 38 to enable the passage of barrel 4 through the opening. It will be noted that if the lock of FIG. 1 were shown in its true relation with FIGS. 2 and 3 by being reduced in size by one-half the thickness of arm 34 at its hooked end is actually only slightly less than the axial distance from shoulder 20 to the base of actuator 32. Therefore, in applying the hook 36 to the fixed locking bolt 10 the semicircular bore 38 engages notch 30 with the consequent depression of the pin 18 to bring the notch thereof in flush position with the shaft thus allowing the arm to be shifted in an axial direction to a location where the semicircular counterbore 40 encircles shoulder 20. FIG. 5 shows that the depth of the counterbore 40 is substantially equal to the thickness of shoulder 20 thereby allowing for the axial movement of arm 34 a sufficient distance to clear pin 18. In this position the spring 26 returns the pin to its neutral position to prevent axial movement of the arm away from shoulder 20. As long as the counterbore 40 is in engagement with the shoulder, the portions 41 of the arm indicated in FIG. 1 encircle the shoulder a sufficient amount so that it is impossible for the shoulder to pass through the throat 42 in any direction in which the arm may be rotated about the shaft 12 unless portions 41 fail in shear.

In disassembling the device the action may be easily affected by pressure of the fingers on the actuator 32. The pin is depressed thus enabling the arm to be moved from the shoulder 20 while the notch is being engaged by semicircular bore 38 and will thus maintain the pin depressed against the action of the spring 26 allowing the strut 46 to be withdrawn by simply removing the hook from the lock assembly. Thus, it can be seen that the complete locking or unlocking operation requires only one hand of the operator.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A quick release fastening device for securing structural members comprising:
   a plate member having an opening therethrough together with said plate having a throat cut therein and extending into the opening;
   the opening in said plate being counterbored to form a recessed seat on one side of said plate;
   a locking member adapted to be engaged by said plate;
   said locking member having a first portion adapted to pass through said throat and a second shoulder portion;
   said shoulder being formed complementary to said seat whereby said plate is withheld from radial movement, by the cooperation of said shoulder and said counterbore, until it is moved in a direction parallel to the axis of said locking member in an amount sufficient to disengage the shoulder from the counterbore;
   retaining means on said locking member operable to hold said plate in engagement with said shoulder;
   said retaining means being movable to a position whereby said plate can be moved in the opposite axial direction to unseat said shoulder and permit disengagement of said plate from said locking member.

2. A quick release fastening device for securing structural members comprising:
   a plate member having a circular opening therethrough together with said plate having a throat cut in the plate and extending into the opening;
   the opening in said plate being counterbored to a depth of approximately one-half the thickness of said plate to form a recessed seat on one side of said plate;
   a locking shaft adapted to be engaged by said plate;
   said locking shaft having a first barrel portion adapted to pass through said throat and a second concentric shoulder portion;
   said shoulder being formed complementary to said recessed seat whereby said plate can be moved parallel with the principal axis of said shaft until said shoulder is journaled within said counterbored seat and whereby said plate is withheld from radial movement, by the cooperation of said shoulder and said counterbore, until it is moved in a direction parallel to the axis of said locking shaft in an amount sufficient to disengage the shoulder from the counterbore;
   retaining means on said locking shaft spaced from said shoulder a distance approximately equal to one-half the thickness of said plate operable to hold said plate in engagement with said shoulder;
   said retaining means being movable to a position whereby said plate can be moved in the opposite direction to unseat said shoulder and permit disengagement of said plate from said locking shaft.

3. A quick release fastening device for securing structural members comprising:
   a plate member having a circular opening therethrough together with said plate having a throat cut therein and extending into the opening so that the sides of the throat are each tangent to the opening;
   the opening in said plate being counterbored to form a stepped seat on one side of said plate;
   a cylindrical bolt member adapted to be engaged by said plate;
   said bolt having a threaded end, a cylindrical end adapted to pass through said throat and a shoulder portion intermediate said ends;
   said shoulder being formed complementary to said seat whereby said plate is withheld from radial movement, by the cooperation of said shoulder and said counterbore, until it is moved in a direction parallel to the axis of said bolt in an amount sufficient to disengage the shoulder from the counterbore;
   a bore extending through said bolt and having its axis normal to the principal axis of said bolt;
   a plunger mounted within the bore and having a locking portion extending therefrom;
   said plunger having a section of the locking portion cut away whereby when said plunger is depressed a predetermined amount said plate can be moved in the opposite direction to clear said shoulder and permit disengagement of said plate from said bolt.

4. The quick fastening device, as defined in claim 3 wherein:
   said bolt having an axial passage communicating with the bore for the reception of a hairpin type spring;
   said plunger having a recess to engage a portion of the free ends of said spring whereby said plunger is biased in its plate locking position.

5. A quick release fastening device for securing structural members comprising:
   a plate member having a circular opening therethrough together with said plate having a throat cut in the plate and extending into the opening so that the sides of the throat are each tangent to the opening and parallel to each other for at least a portion of the throat;
   the opening in said plate being counterbored to a depth of approximately one-half the thickness of said plate to form a recessed seat on one side of said plate;
   a bolt member adapted to be engaged by said plate;
   said bolt having a threaded end, a cylindrical end adapted to pass through said throat and a concentric shoulder portion intermediate said ends;
   said shoulder being formed complementary to said seat whereby said plate is withheld from radial movement, by the cooperation of said shoulder and said counterbore, until it is moved in a direction parallel to the axis of said bolt in an amount sufficient to disengage the shoulder from the counterbore;

a bore extending through said bolt and having its axis normal to the principal axis of said bolt;

a spring biased locking plunger mounted within the bore and extending therefrom an amount sufficient to maintain said plate in journaled relation with said shoulder;

said plunger having a section cut away whereby when said plunger is depressed said plate can be moved in an axial direction to clear said shoulder and thereby permit disengagement of said plate from said bolt.

References Cited by the Examiner

UNITED STATES PATENTS

| 722,178 | 3/1903 | Howard | 287—20.927 X |
| 1,130,807 | 3/1915 | Fingerhut | 287—20.927 X |

FRANK L. ABBOTT, *Primary Examiner.*

RICHARD W. COOKE, Jr., JOHN E. MURTAGH,
*Examiners.*